United States Patent [19]

Baumann et al.

[11] Patent Number: 5,347,549
[45] Date of Patent: Sep. 13, 1994

[54] METHOD AND APPARATUS FOR INTERFACING BETWEEN A TWISTED PAIR AND AN INTELLIGENT CELL

[75] Inventors: Donald D. Baumann, San Jose; W. Mike Berke, Newark; Stephen F. Dreyer, Palo Alto; Rod G. Sinks, Cupertino; Kurt A. Stoll, Fremont, all of Calif.

[73] Assignee: Echelon Corporation, Palo Alto, Calif.

[21] Appl. No.: 49,534

[22] Filed: Apr. 20, 1993

[51] Int. Cl.$^5$ .......................... H04L 5/24; H04B 1/38
[52] U.S. Cl. .......................... 375/117; 370/48; 375/7
[58] Field of Search .......................... 375/117; 370/48

[56] References Cited

U.S. PATENT DOCUMENTS

| | | | |
|---|---|---|---|
| 4,239,934 | 12/1980 | Andren et al. | 375/117 |
| 4,918,690 | 4/1990 | Markkula, Jr. et al. | 370/94 |
| 5,148,144 | 9/1992 | Sutterlin et al. | 375/36 |
| 5,285,481 | 2/1994 | Van Tran | 375/103 |

OTHER PUBLICATIONS

*Implementing Twisted-Pair Transceivers with Neuron Chips,* Echelon Corporation, Aug., 1991, LonWorks Engineering Bulletin.

Primary Examiner—Edward L. Coles, Sr.
Assistant Examiner—Kimberly A. Williams
Attorney, Agent, or Firm—Blakely, Sokoloff, Taylor & Zafman

[57] ABSTRACT

A transceiver module for coupling between cells in a distributed intelligence network and a twisted pair line. The module receives power from the line and provides power to its respective cell. At the end of transmitting a packet, the transceiver transmits a code violation (pulse), then an anti-code violation (pulse of opposite polarity) to dissipate energy in the line. This is followed by clamping the line for the dead time between packets. N transceivers may be connected (without a cell) to form a repeater. The transceiver module may be used in a network having free topology; that is, an ideal transmission line, with terminators is not needed.

12 Claims, 3 Drawing Sheets

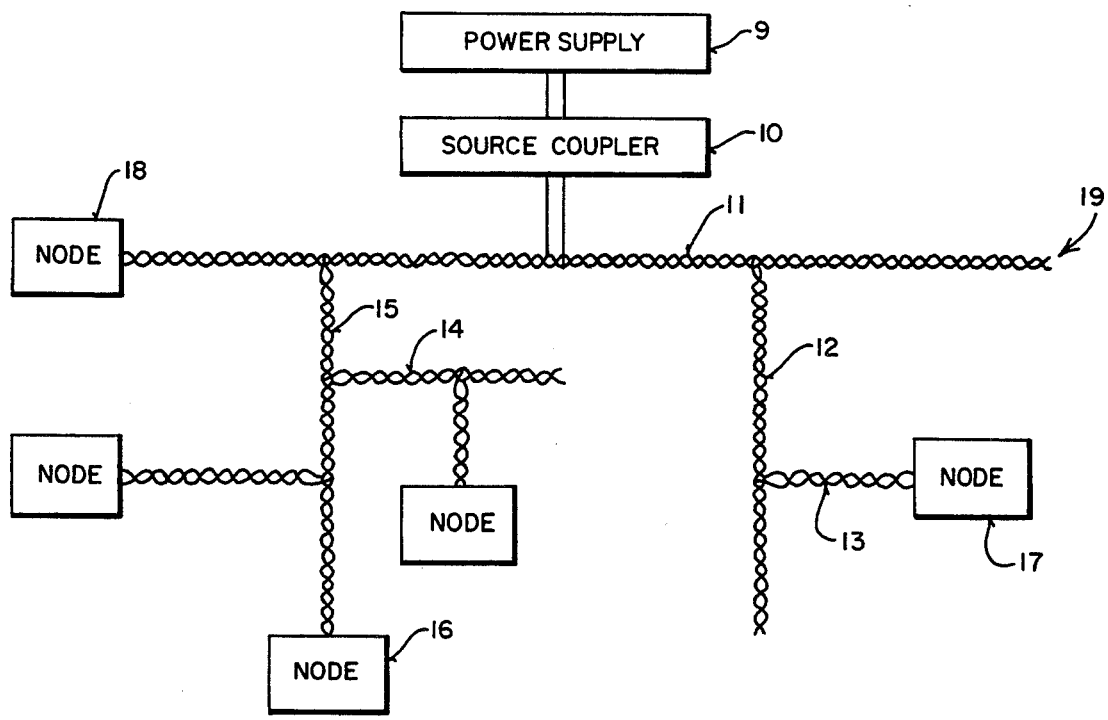
FIG_1
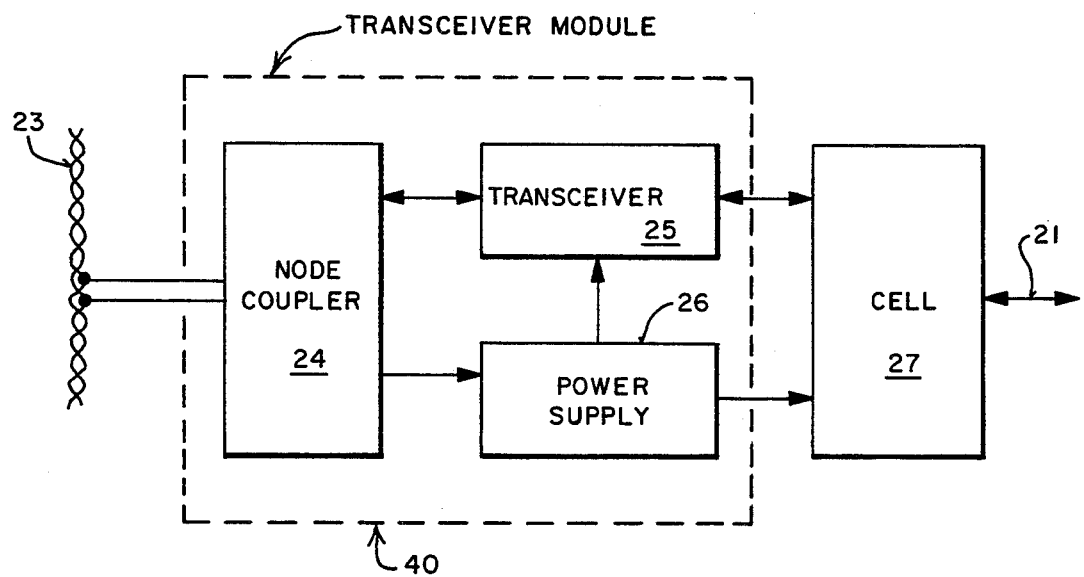
FIG_2

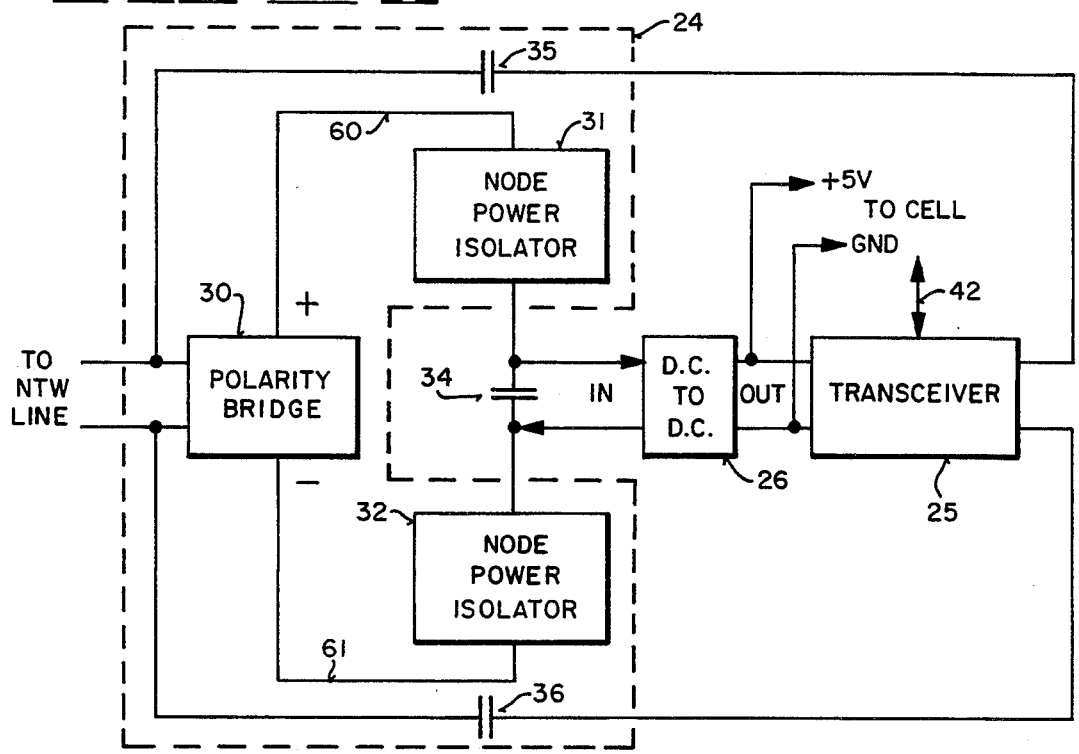
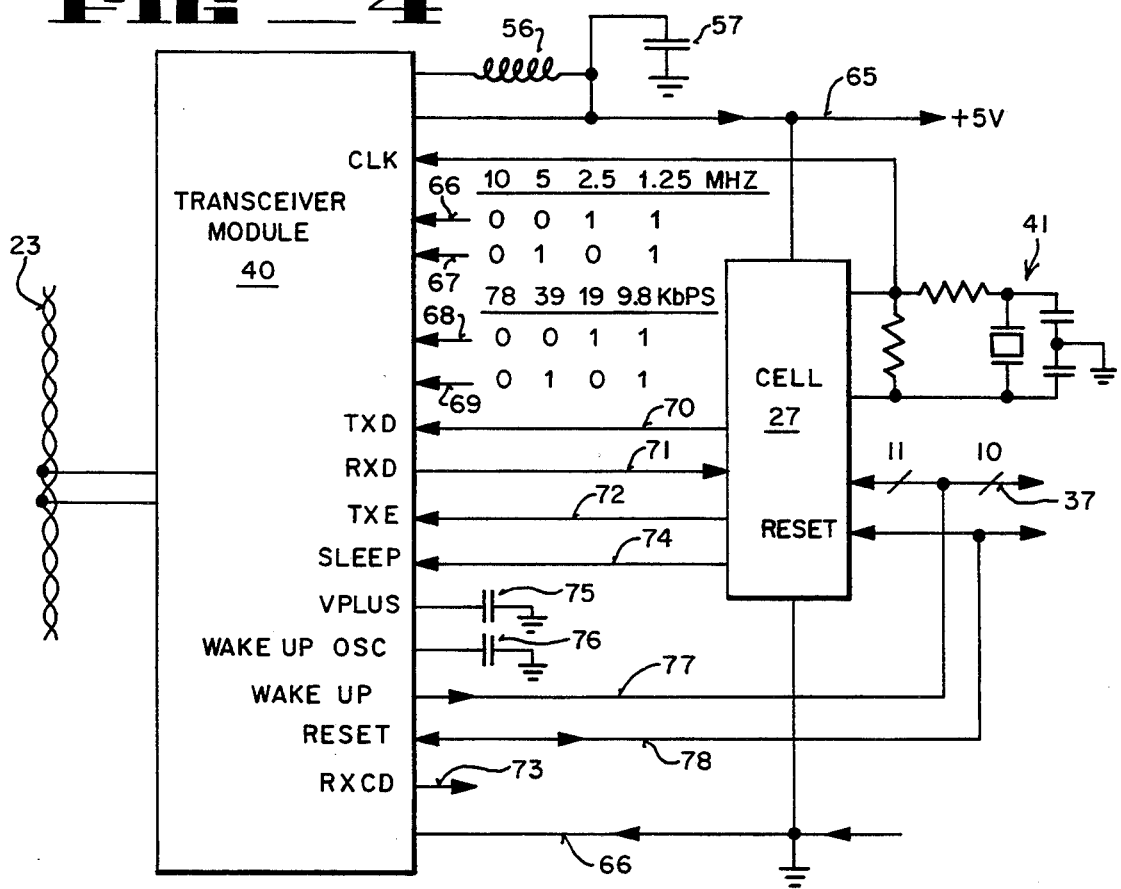

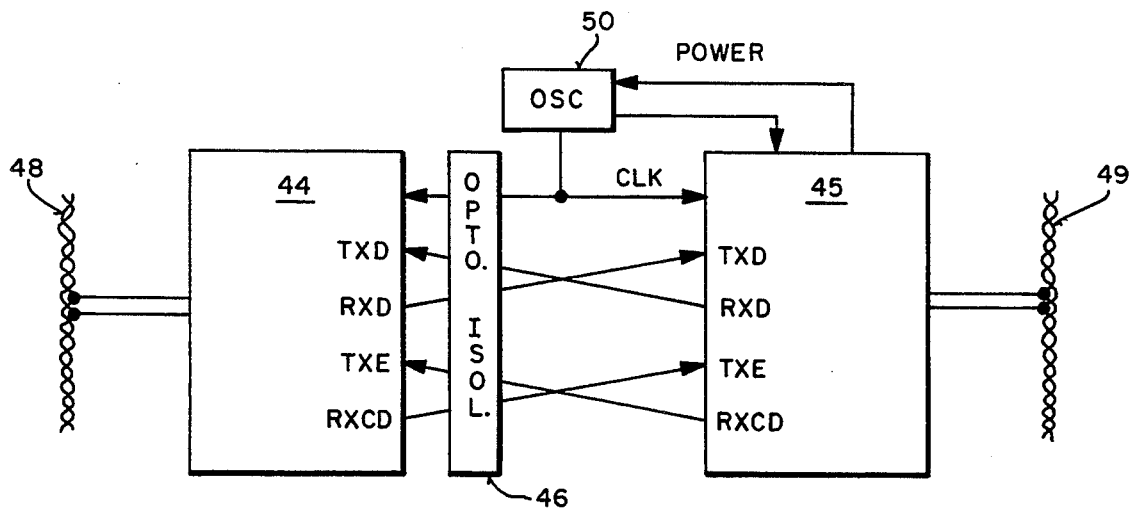
FIG_5
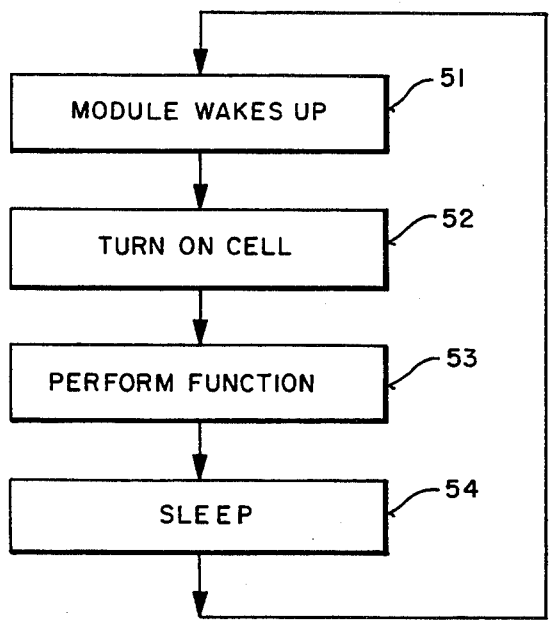
FIG_6
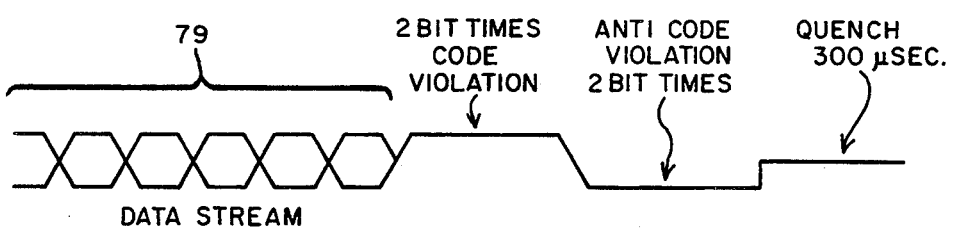
FIG_7

METHOD AND APPARATUS FOR INTERFACING BETWEEN A TWISTED PAIR AND AN INTELLIGENT CELL

BACKGROUND OF THE INVENTION

1. Field of the Invention

The invention relates to the fields of transceivers and transceiver modules, particularly those which provide an interface between a twisted pair line and an intelligent cell, and power distribution over a data transmission medium.

2. Prior Art

Distributed-intelligence networks are known which provide sensing, communications and control such as the network described in U.S. Pat. No. 4,918,690. This network comprises a plurality of nodes, each of which includes a cell and transceiver, connected to a common medium such as a twisted pair line.

Transceivers and related components for such networks are described in U.S. Pat. No. 5,148,144 and in a publication entitled "Implementing Twisted-Pair Transceivers with Neuron® Chips", published by Echelon Corporation, August 1991.

As will be seen, the present invention provides an improved transceiver module for operating with a single twisted pair line where both power and communications are transmitted over the single twisted pair line.

SUMMARY OF THE INVENTION

An improvement is described in a network having a plurality of nodes interconnected by a line such as a twisted pair line, where communications occur by transmitting packets over the line and where the end of a packet is signified by the transmission of a first pulse. The first pulse, in addition to having a known polarity, has a predetermined duration which is longer than the duration of the pulses used to represent data within the packets. After the first pulse is transmitted onto the line, a second pulse is transmitted onto the line. This second pulse is of an opposite polarity to the first pulse and has a duration approximately equal to the duration of the first pulse. Then following the second pulse, the line is clamped. This method attenuates transients in the line that may otherwise occur during the dead time between packets.

Also, as will be seen, transceiver modules of the present invention may be interconnected to form a repeater for repeating packets between networks.

Additionally, as will be seen, each transceiver module can operate in a sleep mode for reducing power within the module. This mode is particularly useful where the cell only needs to periodically sense a condition or event.

Other aspects of the present invention will be apparent from the following detailed description.

BRIEF DESCRIPTION OF THE DRAWINGS

FIG. 1 is an overall diagram of a network. This diagram is used to show the free topology which may be used with the method and apparatus of the present invention.

FIG. 2 is a block diagram showing the principal components associated with each of the nodes of the network of FIG. 1.

FIG. 3 is a block diagram of a transceiver module in accordance with the present invention.

FIG. 4 is a block diagram showing the connections for a transceiver module in accordance with the present invention.

FIG. 5 illustrates the coupling between two transceiver modules of the present invention used to form a repeater.

FIG. 6 illustrates a series of steps associated with the sleep mode of the present invention.

FIG. 7 illustrates a waveform used to describe the signals coupled onto the line between data packets to dissipate energy and prevent ringing on the line as taught by the present invention.

DETAILED DESCRIPTION OF THE PRESENT INVENTION

A transceiver module for use in a network having distributed intelligence is described. In the following description, numerous specific details are set forth, such as specific voltage levels, in order to provide a thorough understanding of the present invention. It will be apparent to one skilled in the art that the present invention may be practiced without use of these details. In other instances, well-known circuits and methods are not set forth in detail in order not to unnecessarily obscure the present invention.

Overview of the Network

Referring now to FIG. 1, a network is illustrated which includes a plurality of nodes, such as nodes 16, 17 and 18 interconnected by twisted pair lines. The lines as illustrated, form numerous branches such as branches 11, 12, 13, 14 and 15. The transceiver modules of the present invention permit the branches to be placed virtually anywhere; that is, the topology of the network is not constrained. Branches may be simply added where needed. Termination is not required, for instance, end 19 is not terminated. Moreover, as will be seen this two wire interconnection between nodes is polarity insensitive. Also different gauge wires may be used, for example, line 11 may be a twelve gauge wire and line 15 may be a twenty-two gauge wire. This free topology which may consist of a single branch a ring, a star or some combination of these, is in sharp contrast to some twisted pair topologies that require an ideal, doubly terminated, transmission line.

In the currently preferred embodiment, all the nodes receive power over the twisted pair lines from a central power supply 9. The power supply 9 is connected to the network through the source coupler 10. The source coupler 10 provides isolation between the twisted pair line and the power supply; it allows the power to flow from the power supply 9 while allowing the high frequency communications signals in the twisted pair line to exist. The currently preferred embodiment of the coupler 10 is described in co-pending application Ser. No. 08/091,877, entitled "Power Coupler For Coupling Power From A Transmission Line To A Node Thereon", filed on Jul. 14, 1993, and assigned to the assignee of this application. In the currently preferred embodiment, a DC potential of 42 volts (or lower) is used and is applied to the twisted pair line 11 for distribution to all the nodes of the network from the power supply 9 as regulated by the source coupler 10.

The network of FIG. 1 operates generally as described in U.S. Pat. No. 4,918,690. For example, a light switch may be associated with node 17 and when the position of the switch is changed, it is sensed and an appropriate data packet or packets is transmitted via the branches to node 16 which may control a light.

A typical node of FIG. 1 is shown in FIG. 2 as comprising a transceiver module shown within dotted line 40 which interfaces between a twisted pair line 23 and a cell 27. Through lines 21, the cell may control and/or sense as described in U.S. Pat. No. 4,918,690. In the currently preferred embodiment, the transceiver module 40 comprises a node coupler 24, power supply 26 and a signal transceiver 25. The coupler 24 permits the high frequency communications packets to be coupled from the line 23 to the transceiver 25 while allowing the DC power from the line 23 to be coupled to the power supply 26. Transceiver 25 detects the incoming data and communicates it to the cell. The transceiver also receives outgoing data from the cell 27, develops the appropriate waveforms for transmission in the network and then couples the outgoing data through the coupler onto line 23. Power supply 26 receives power at the line voltage (such as 42 volts) from the line 23 and converts it to +5 volts for powering transceiver 25 and cell 27.

Current Preferred Embodiment of the Transceiver Module of the Present Invention The transceiver module 40 of FIG. 2 is shown in more detail in FIG. 3. The polarity bridge 30 is coupled directly to the twisted pair line and assures that the positive DC potential from the network is coupled to line 60 and that the other line of the twisted pair is coupled to line 61.

The power supply 26 converts the DC potential from the twisted pair line to +5 volts in the currently preferred embodiment. The DC-to-DC power supply 26 in the currently preferred embodiment, is capable of receiving a voltage from 18 to 42 volts and converting it to +5 volts for powering transceiver 25 and the cell. The power supply 26 is coupled to the line 23 through two node power isolators, isolator 31 and isolator 32. These isolators provide, at their outputs, a DC potential across the capacitor 34 which potential is converted in the DC-to-DC power supply 26 to +5 volts. In effect, the isolators 31 and 32 pass the DC potential to the capacitor 34 while preventing the high frequency communications signals on lines 60 and 61 from being attenuated by the power supply 26. Thus the isolators 31 and 32 ideally have zero impedance from, for example, DC up to 1 kHZ and provide substantial impedance in the range from 1 kHZ up to 100 kHZ. The isolators may be realized from discrete, passive components well-known in the art. In the currently preferred embodiment, the isolators are realized employing bipolar technology (without inductors) and in fact, the isolators 31,32 and DC-to-DC power supply 26 are fabricated as a bipolar integrated circuit on a single substrate. The currently preferred embodiment of the isolators and related circuitry is disclosed in co-pending application Ser. No. 08/094,459, entitled "Apparatus and Method for Providing AC Isolation While Supplying DC Power", filed on Jul. 20, 1993, and assigned to the Assignee of the present application.

The transceiver 25 communicates with a twisted pair line through the capacitors 35 and 36 and with the cell through lines 42. Because of the free topology permitted in the network of FIG. 1, the waveforms of the pulses transmitted from transceiver 25 onto the line are shaped to reduce, for example, ringing, reflections, etc. The transceiver 25 as currently preferred, is fabricated on a single substrate employing complementry metal-oxide-semiconductor (CMOS) technology. The specific waveforms used and other details of the transceiver 25 are disclosed in co-pending application Ser. No. 08/092,252, entitled "Transceiver for Transmitting And Receiving Stain-Stepped Sinusoidal Waveforms", filed on Jul. 14, 1993 and assigned to the Assigned of the present application.

As currently preferred, all of the components of FIG. 3 are packaged together in a single module illustrated in FIG. 4 as the transceiver module 40. The module 40 is shown coupled to a twisted pair 23. The module 40 supplies +5 volts on line 65; this potential is coupled to a cell 27. An external inductor 56 and capacitor 57 are part of the DC-to-DC supply 26. The return line for the power is line 66. This power may also be used to operate other components associated with the node, for instance, the power may be used by a sensor or control element which is coupled to the cell 27 via the lines 37.

An oscillator circuit 41 external to the cell 27 which includes a crystal, generates clocking signals for both the cell 27 and the transceiver module 40. Terminals 66 and 67 of the module 40 are relatively coupled to the +5 volt potential or ground to select a frequency of operation for the module. For instance, 10 MHz is selected by coupling both terminals 66 and 67 to ground and 2.5 MHz is obtained by coupling terminal 66 to +5 volts and terminal 67 to ground. Additionally, the bit rate for the transceiver module is selectable by coupling terminal 68 and 69 to either ground or the +5 volt potential. For instance, 78 kbps is obtained by coupling both terminals 60 and 69 to ground whereas the lowest bit rate of 9.8 kbps is obtained by coupling both terminals to +5 volts.

When the cell 27 is ready to transmit data, it provides an enable signal on line 72 which is coupled to the TXE terminal of module 40. This transmit enable signal enables the module to receive the packets of data on line 70 and to transmit them onto the twisted pair line 23. Whenever data is sensed on the twisted pair line, a carrier detection occurs within the module and a signal is presented at terminal 73. For the embodiment of FIG. 4 this signal is not used,. The data from line 23 is coupled to the cell over line 71 from the RXD terminal.

The cell 27 is capable of providing a sleep signal to module 40 over line 74. This signal causes the transceiver module 40 to power-down, that is, to consume less power. When asleep, the module 40 cannot sense data on the line 23. However, the module's power supply operates to provide power to the cell and certain circuits of the module 40, such as the wake up circuitry. The wake up circuitry of the module 40 is coupled to an external capacitor 76. The capacitance of this capacitor is selected depending on how long the sleep periods are to be. At the end of the sleep period a wake up signal is transmitted from the module 40 to the cell 27 via line 77. The operation of the sleep mode is described in conjunction with FIG. 6. A capacitor 75 is also coupled to the module 40 to provide power supply filtering. A reset signal is coupled to the module over line 78.

Repeater

Two or more of the transceiver modules 40 of FIG. 4 can be coupled together to form an n-way repeater without the need of a cell. Referring to FIG. 5, assume that it is necessary to repeat signals between the twisted pair lines 48 and 49. To form a repeater, two modules 44 and 45 are used as shown in FIG. 5; each of these modules may be identical to the module 40 of FIG. 4. Only those module terminals needed to describe the repeater function are shown in FIG. 5.

To form the repeater, the receive data terminal of the module 44 is connected to the transmit data terminal of the module 45. Similarly, the receive data terminal of the module 45 is connected to the transmit data terminal of the module 44. The receive carrier detection terminal of the module 44 is connected to the transmit enable terminal of the module 45. Similarly the receive carrier detection terminal of the module 45 is coupled to the transmit enable terminal of the module 44. These connections are preferably made through optical isolators 46.

If data is present on the twisted pair line 48, a carrier detection will occur within module 44 and this will enable the transmit function of the module 45. The data from the line 48 will be coupled from the RXD terminal of module 44 to the transmit terminal of the module 45 and be coupled on to the line 49. Similarly, if a data signal is present on line 49, a carrier will be detected by the module 45 which will enable transmission of the module 44. The data received from the line 49 will be coupled to the transmit terminal to the module 44 and be transmitted onto the line 48.

As shown in FIG. 5, an oscillator 50 which may be identical to the oscillator circuit 41 of FIG. 4 provides a clock signal to both the modules 44 and 45. This oscillator may be powered from either of the modules.

An n-way repeater is made relatively simple by an internal feature of the transceiver modules. This feature assures that once a module's RXCD signal becomes active (e.g., high) its internal TXE signal will remain inactive (e.g. low). For this reason, the n-way repeater uses only two n-input OR gates. One OR gate receives as inputs all the RXCD signals, its output is coupled to all the TXE terminals. The receiving module does not transmit even though its TXE terminal is driven by the OR gate because of the feature mentioned above. The other OR gate receives as inputs all the RXD signals, its output is coupled to all the TXD terminals. Again, as in the two way case shown in FIG. 5, optical isolation may be used.

Sleep Mode

In some applications the cell 27 of FIG. 4 may only need to periodically operate. For instance, if the cell 27 is sensing a fire detector, smoke detector, security device, etc., it may only need to sense the state of such detector once, for example, every two seconds. In this role, the transceiver module is used simply to communicate the state of the detector as determined by the cell to the network and may not be required to communicate data from the network to the cell. To conserve power in these applications, in the currently preferred embodiment, the cell and transceiver may be put to sleep.

Assume that the cell 27 has just completed interrogating the sensor and has reported through the transceiver module the state of the sensor. After completing this function (shown as function 53 of FIG. 6) the cell provides a sleep signal over line 74 to the module 40. The cell itself then goes into a powered-down state thereby providing most of the power savings. The signal on line 74 causes the module to be powered-down, for instance, the module no longer senses communications signals on line 23. This is shown by step 54 of FIG. 6.

The duration of the sleep period is controlled by the capacitance of the capacitor 76. After, for example, two seconds, the module 40 begins to operate again as shown by step 51. A wake up signal is sent via line 77 to the cell 27 as shown by step 52. This reactivates the cell causing it to again perform a function such as sense the state of a detector and to communicate a packet or packets concerning the state of the detector to the network.

DAMPENING STRAY SIGNALS ON THE TWISTED PAIR LINES

In the currently preferred embodiment, the data stream is transmitted as pulses having an amplitude of ±1 volt superimposed on the DC power. The data is organized into packets by the cell transmitting the data. A minimum predetermined "dead time" occurs between the packets. Because of the free topology, transients may occur within the twisted pair lines during this dead time..

In FIG. 7, the bits 79 represent data bits occurring at the end of a data packet transmitted onto the twisted pair line. At the end of the transmission, the transmit enable signal goes inactive for the cell providing the transmission. This is the signal coupled on line 72 of FIG. 4. At the end of packet transmission the cell transmits a pulse having a pulse width two times the data pulse width. This is shown in FIG. 7 as "code violation". Such code violations are used, for example, in an Ethernet network to signify the end of a packet. All nodes are able to sense this code violation and can use this information to initiate a timing sequence. The code violation is of a predetermined length of either polarity, for example, +1 volt.

With the present invention the code violation is immediately followed by an anti-code violation. This is a pulse of opposite polarity to the code violation and equal in duration to the code violation; for instance, −1 volts for two bit times as shown in FIG. 7. The anti-code violation is provided by the transceiver module which transmitted the code violation. The purpose of the anti-code violation is to nullify the effects of the code violation signal. Note that if the twisted pair line were released by the transceiver module at the end of the code violation, it would be charged and undesirable transients may occur in the network. The anti-code violation thus is used to compensate for the code violation. However, unlike the code violation it is not used to communicate information on to the network.

Following the anti-code violation the two transceiver output terminals are clamped together through a low impedance switch for a period of at least 300 microseconds, in the currently preferred embodiment. This is shown as "quench" in FIG. 7. This further serves to prevent unwanted transients on the line. This quenching may continue during the entire guaranteed dead time between packets.

Thus, a transceiver module has been described which is particularly useful in a network having intelligent cells interconnected by a twisted pair line.

We claim:

1. In a network having a plurality of nodes interconnected by a line where communications occur by transmitting packets over the line and where the end of a packet is signified by the transmission of a first pulse having a predetermined duration and a polarity, an improved method comprising the steps of:

transmitting onto the line a second pulse following the first pulse, the second pulse being of an opposite polarity to the first pulse and having a duration approximately equal to the predetermined duration of the first pulse; and, following the second pulse, clamping the line.

2. The method defined by claim 1 wherein the clamping is terminated before the next packet is transmitted.

3. The method defined by claim 2 wherein the transmitting onto the line occurs from a pair of terminals and the clamping comprises connecting together the pair of terminals.

4. A method for reducing unwanted charge on a line in a network where data is transmitted in packets over the line, comprising the steps of;

transmitting an ending pulse at the end of a packet, the ending pulse having a duration longer than durations of pulses used for transmitting data within the packets, the ending pulse having a polarity;

following the ending pulse, transmitting an additional pulse having a polarity opposite to that of the ending pulse and having a duration approximately equal to the duration of the ending pulse.

5. The method defined by claim 4 wherein the transmitting steps occur from a pair of terminals and the method comprises an additional step of connecting together the pair of terminals following said additional pulse.

6. In an apparatus for transmitting data packets in a network, the method comprising the steps of;

transmitting an ending pulse at the end of a packet, the ending pulse having a duration longer than durations of pulses used to represent data within the packets, the ending pulse having a polarity;

following the ending pulse, transmitting an additional pulse having a polarity opposite to that of the ending pulse and having a duration approximately equal to the duration of the ending pulse.

7. The method defined by claim 6 including the step of clamping lines in the network.

8. The method defined by claim 7 wherein the clamping comprises connecting the lines together.

9. In a network having a plurality of nodes, each having a transceiver and a cell, an improved method of operation comprising the steps of;

providing a powered-down signal from the cell to the transceiver upon the occurrence of a predetermined activity;

reducing power consumed in the node in response to powered-down signal;

reactivating power to the transceiver after a predetermined duration; and, transmitting a reactivation signal to the cell.

10. The method defined by claim 9 wherein the predetermined activity is the completion of a function performed by the cell.

11. The method defined by claim 10 wherein the predetermined duration is selectable.

12. The method defined by claim 11 wherein the selectability of the duration comprises the step of connecting a capacitor at a terminal of the transceiver.

* * * * *